3,274,691
FLUID LEVEL INDICATORS
Charles P. Bolles, Dearborn, Mich., assignor to General Motors Corporation, Detroit, Mich., a corporation of Delaware
Filed July 6, 1964, Ser. No. 380,387
10 Claims. (Cl. 33—126.7)

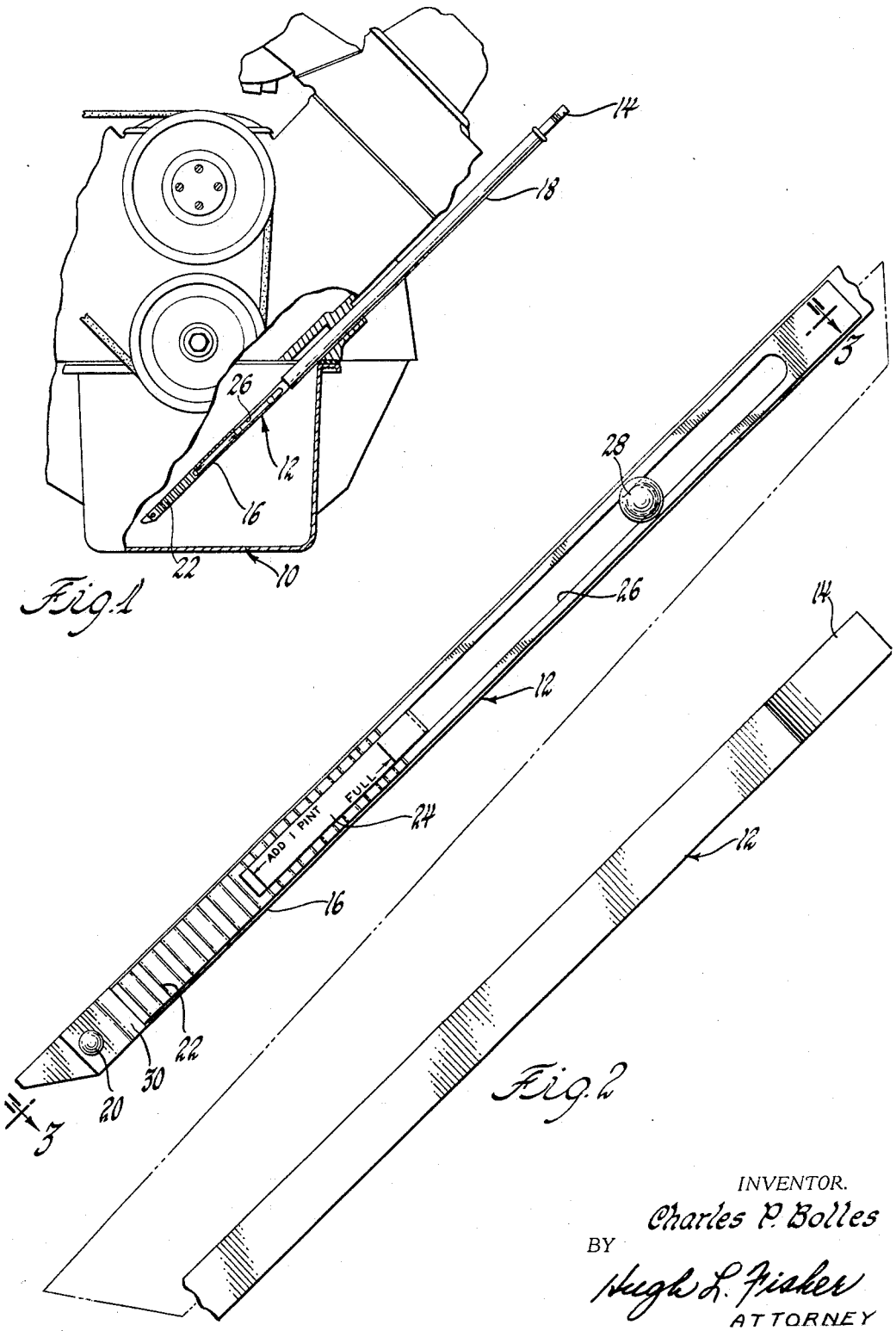

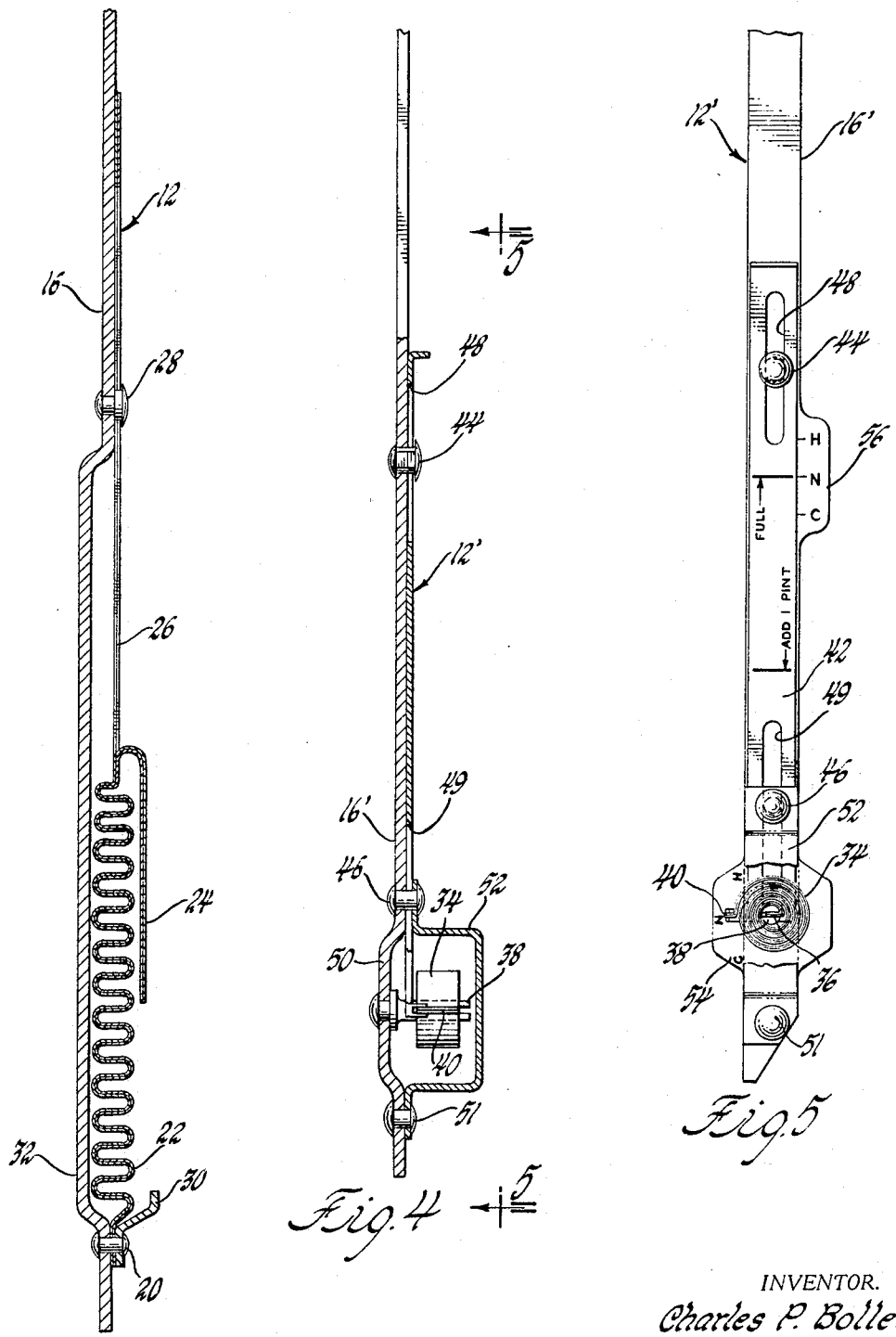

This invention relates to fluid level indicators and particularly to oil level indicators adapted for use, although not exclusively, with motor vehicles.

The usual oil level indicator is in the form of a dipstick with marks indicating the critical oil levels; for instance, full, add oil, etc. These marks are generally determined for normal operating temperatures of the oil and therefore necessarily ignore the errors that can be introduced due to extreme variations in the temperature of the oil. If the oil level is critical as it sometime is; e.g., too much oil may result in faulty transmission operation, whereas insufficient oil may starve an engine lubrication system, extreme temperature changes cause the conventional dipstick to misrepresent the actual oil level. As a result, oil may not be added when it should be or may be added when it should not be.

Accordingly, a novel fluid indicator is proposed that senses the temperature of a fluid whose level is being measured and makes corresponding corrections in the indication of the fluid level.

The foregoing and other objects and advantages of the invention will become apparent from the following description and from the accompanying drawings in which:

FIGURE 1 illustrates a vehicle engine crankcase dipstick incorporating the principles of the invention;

FIGURE 2 is an enlarged view of the dipstick;

FIGURE 3 is a sectional view of the dipstick taken along lines 3–3 of FIGURE 2;

FIGURE 4 is a sectional view of a modification of the FIGURE 2 dipstick; and

FIGURE 5 is a view of the FIGURE 4 dipstick looking in the direction of arrows 5–5 in FIGURE 4.

Referring now to the drawings in detail and initially to FIGURE 1, the numeral 10 denotes generally a vehicle engine crankcase whose oil level is to be measured by a fluid indicator or dipstick shown generally at 12. The dipstick 12 includes the usual handle 14 and an elongated body 16 that is inserted into the crankcase 10 through a tube 18.

Considering now the dipstick portrayed in FIGURES 2 and 3, the body 16 at the lower end thereof has attached thereto as by a rivet 20 a lower end of a bi-metallic undulated or corrugated strip 22. The upper end of the bi-metallic strip 22 has a pierced out and downwardly bent portion that serves as a scale and is indicated at 24. This piercing out operation provides an elongated slot 26 that facilitates the connection of the upper end of the bi-metallic strip 22 to the body 16 of the dipstrick 12. Consequently, a single holding rivet 28 can be used through the intermediary on the slot 26 to slidably join the upper end of the strip 22 to the body 16.

As can be observed in FIGURE 2, the scale 24 is provided with two marks, one designated "add 1 pint" and the other denoted "full." These "add 1 pint" and "full" marks are chosen for a certain oil having a known viscosity as well as the capacity of the crankcase 10. Also, the bi-metallic materials used for the strip 22 are chosen to give the thermal response wanted for this particular viscosity of oil and the necessary calibrations are made. Then, when the dipstick 12 is installed, assuming that the oil level is that desired at atmospheric temperature, the level of the oil will be at the "full" mark. If, subsequently, the oil temperature is increased substantially, a corresponding increase in the oil level will occur and the "full" mark will be moved upwardly the same amount by the resultant expansion of the bi-metallic strip 22 and still coincide with the increased level. Correspondingly, if the temperature of the oil is decreased considerably, the "full" mark will be moved downwardly and still accurately indicate the level of the now cooled oil. Of course, the "add 1 pint" mark will be moved in the same way and reflect the same need to add oil regardless of the temperature of the oil.

As best shown in FIGURE 3, a shield 30 is installed to the bottom of the body 16 by the rivet 20 and the body 16 is inturned at 32 so as to afford a partial enclosure for the bi-metallic strip 22. This partial enclosure will protect the bi-metallic strip 22 against damage during the removal and insertion of the dipstick 12 into the tube 18.

The modified dipstick 12' displayed in FIGURES 4 and 5 utilizes a coil or hair-spring 34 of bi-metallic material. The hair-spring 34 has an inside end 36 connected to the body 16' by a split pin 38. An external end 40 is suitably affixed to an indicator scale 42 that is slidably joined to the body 16' by the coaction of two pins or rivets 44 and 46 which are attached to the body 16' and two elongated slots 48 and 49 which respectively receive the rivets 44 and 46. The oil level marks are designated again as "full" and "add 1 pint." The body 16' is, as seen in FIGURE 1, slightly indented at 50 in the vicinity of the pin 38 and has secured thereto by a rivet 51 and a rivet 46, a cover 52 for providing a protective housing for the hair-spring 34. Also, the body 16' at the indented part 50 is provided with a scale 54 with the letters C, N, and H representing respectively cold, normal and hot operating temperatures. This scale 54 is opposite the hair-spring end 40, which serves as a pointer.

This modified dipstick 12' operates substantially the same way as the dipstick 12 illustrated in FIGURES 2 and 3. When installed in the container for the oil, such as the crankcase 10, the hair-spring 34, because of its bi-metallic construction, will expand or contract in calibrated amounts and maneuver the scale 42 accordingly so that with a hot temperature, the "full" mark will be moved upwardly and with a cold temperature the "full" mark will be moved downwardly.

Additionally, when checking the oil, the disposition of the end 40 relative to the letters C, N, and H on the scale 54 indicates the temperature status of the oil, i.e., whether cold, normal or hot. Consequently, the temperature conditions existing at the time the oil is being checked are readily ascertainable.

If wanted, the scale 54 can be relied upon exclusively and the scale 42 manually adjusted to one of the three settings derived from the scale 54. This would involve merely disconnecting the scale 42 from the hair-spring end 40 and providing C, N, and H marks on the body 16' as at 56 adjacent the same part of the scale 42 such as the "full" mark. Then, if the scale 54 indicated a cold oil condition, the scale 42 would be moved until the "full" mark was opposite the "C" mark on the body 16'.

As will be appreciated, the described dipsticks themselves afford a simple and convenient way of compensating for oil level changes due to temperature variations. This is done without requiring that one have a special knowledge of oil viscosities and temperature sensitivities before the actual oil level can be determined. Moreover, these dipsticks afford complete protection against situations that might result in the oil level being increased by mistake or a dangerously low level being ignored.

It should be kept in mind that the described use of the dipsticks for checking engine crankcase oil level is exemplary only and that the dipsticks can be used to check the transmission oil level as well. In fact, the level of any fluid can be measured by the dipsticks. Only appropriate calibrations well understood by those versed in the art need to be made for the different fluids and their containers.

The invention is to be limited only by the following claims.

What is claimed is:

1. A fluid level indicator comprising, in combination, an elongated element adapted to be inserted into a container of a fluid whose level is to be indicated, temperature responsive means so positioned on the element as to be sensitive to the temperature of the fluid, and a fluid level indicating scale positioned on the element so as to be immersible in the fluid and adapted to be maneuvered on the element by the temperature responsive means distances reflecting the influence of the fluid temperature on the fluid level indicated by the scale.

2. A fluid level indicator comprising, in combination, an elongated element adapted to be inserted into a container of fluid whose level is to be indicated, a temperature responsive member movably joined to the elongated element and so positioned thereon as to be responsive to the fluid temperature, the member having movement in accordance with the temperature of the fluid, and a fluid level indicating scale movably positioned on the element so as to indicate the fluid level by the extent of immersion thereof in the fluid, the scale being adapted for movement corresponding to the movement of the member so as to permit compensation for the influence of fluid temperature on fluid level indicated by the scale.

3. A fluid level indicator comprising, in combination, an elongated element adapted to be inserted into a fluid container, a bi-metallic temperature responsive member movably joined to the element and so positioned thereon as to respond to variations in the fluid temperature, and a fluid level indicating scale also movably joined to the element for visually reflecting fluid level, the scale being operatively connected to the temperature responsive member and immersible in the fluid so as to adjust the setting of the scale in accordance with the temperature of the fluid and thereby compensate for the influence of fluid temperature on the fluid level indicated by the scale.

4. A fluid level indicator comprising, in combination, a rod adapted to be inserted into a container of fluid whose level is to be indicated, a liquid level scale movably positioned on the rod so as to be immersible in the fluid, and a temperature responsive member movably joined to the rod so as to sense the temperature of the fluid and operatively connected to the scale so as to maneuver the scale relative to the rod in response to variations in the temperature of the fluid and thereby compensate for the influence of fluid temperature variations in the fluid level indicated by the scale.

5. A fluid level indicating dipstick comprising, in combination, a handle and an elongated body adapted to be inserted into a container of fluid whose level is to be indicated, a bi-metallic member movably joined to the elongated body so as to be immersed in the fluid and thereby responsive to variations in the temperature of the fluid, a fluid level indicating scale slidably mounted on the body so as to be immersible in the fluid and adapted to be maneuversed by the bi-metallic member so as to compensate for the influence of fluid temperature variations on the fluid level indicated by the scale.

6. A fluid level indicating dipstick comprising, in combination, a handle and an elongated body adapted to be inserted into a container of fluid whose level is to be indicated, a temperature responsive member including a bi-metallic portion, the member being so positioned on the body as to be responsive to changes in temperature of the fluid, and a fluid level indicating scale so movably positioned on the body so as to be immersible in the fluid and so as to be capable of movement corresponding to the movement of the member and thereby compensate for the influence of fluid temperature variations on the fluid level indicated by the scale.

7. An oil level indicating dipstick comprising, in combination, a handle and an elongated body adapted to be inserted into a container of oil, and a temperature responsive member having one end affixed to the body and the other end movably joined to the body, the member including a bi-metallic portion of corrugated configuration and an integral oil level indicating scale, the bi-metallic portion being operative in response to oil temperature changes to maneuver the scale accordingly and thereby compensate for the influence of oil temperature on oil level indication.

8. A fluid level indicating dipstick comprising, in combination a handle and an elongated body adapted to be inserted into a container of fluid whose level is to be measured, a fluid level indicating scale maneuverably mounted on the body so as to be immersible within the fluid, a bi-metallic coil spring having one end joined to the element and the other end connected to the scale, the spring being so positioned on the body as to be immersed within the fluid and thereby maneuver the scale in response to changes in the fluid temperature sensed for compensating for the influence of fluid temperature on fluid level indicated by the scale.

9. An oil level indicating dipstick comprising, in combination, a handle and an elongated body adapted to be inserted into an oil container, an oil level indicating scale slidably mounted on the dipstick and a bi-metallic hairspring having one end secured to the body and the other end thereof joined to the scale so as to maneuver the scale in accordance with the oil temperature sensed thereby compensating for the influence of oil temperature on the oil level indicated by the scale.

10. A fluid level indicating dipstick comprising, in combination, a handle and an elongated body adapted to be inserted in a fluid container, a bi-metallic element movably mounted on the body so as to be immersed within the fluid, the bi-metallic element being operative in response to fluid temperature changes to be maneuvered to a series of fluid temperature indicating settings, and a fluid level indicating scale movably mounted on the body so as to be immersible within the fluid and maneuverable to a series of settings corresponding to the settings indicated by the bi-metallic element so as to compensate for the influence of fluid temperature variations on the fluid level indicated thereby.

References Cited by the Examiner

UNITED STATES PATENTS

| | | | |
|---|---|---|---|
| 1,582,313 | 4/1926 | Simmons | 33—125 |
| 1,736,797 | 11/1929 | Mortensen | 73—393 |
| 1,771,646 | 7/1930 | Miquelon | 73—292 X |
| 1,881,150 | 10/1932 | Trapp | 73—363.5 X |
| 1,898,848 | 2/1933 | O'Brien | 73—363.5 X |
| 1,948,310 | 2/1934 | Oliver et al. | 33—126.7 |
| 1,991,495 | 2/1935 | Derby | 73—363.5 |

LEONARD FORMAN, *Primary Examiner.*

ISSAC LISANN, *Examiner.*

W. D. MARTIN, *Assistant Examiner.*